United States Patent
Qin

(10) Patent No.: US 11,425,698 B2
(45) Date of Patent: Aug. 23, 2022

(54) METHOD, DEVICE AND SYSTEM FOR PERFORMING WIRELESS COMMUNICATION IN WIRELESS COMMUNICATION SYSTEM

(71) Applicant: Sony Corporation, Tokyo (JP)

(72) Inventor: Zhongbin Qin, Beijing (CN)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 17/035,789

(22) Filed: Sep. 29, 2020

(65) Prior Publication Data

US 2021/0014856 A1 Jan. 14, 2021

Related U.S. Application Data

(60) Continuation of application No. 16/391,320, filed on Apr. 23, 2019, now Pat. No. 10,820,306, which is a (Continued)

(30) Foreign Application Priority Data

May 28, 2013 (CN) .......................... 201310202975.8

(51) Int. Cl.
*H04W 72/04* (2009.01)
*H04W 52/14* (2009.01)
(Continued)

(52) U.S. Cl.
CPC ......... *H04W 72/0413* (2013.01); *H04L 5/001* (2013.01); *H04L 5/0035* (2013.01);
(Continued)

(58) Field of Classification Search
CPC ............. H04W 72/0413; H04W 24/08; H04W 52/146; H04W 52/242; H04W 28/085; H04L 5/001; H04L 5/0035; H04L 5/0053
See application file for complete search history.

(56) References Cited

U.S. PATENT DOCUMENTS 9,301,286 B2   3/2016 Chung et al.
9,729,293 B2 * 8/2017 Imamura ............... H04L 5/0035
(Continued)

FOREIGN PATENT DOCUMENTS

CN   102076062 A    5/2011
CN   102804872 A   11/2012
(Continued)

OTHER PUBLICATIONS

ETRI, "CA Extension in Support of Inter-Site CA", 3GPP TSG RAN WG1 Meeting # 73 R1-132558, XP050698275, 3 Pages total, (May 20-24, 2013).

(Continued)

*Primary Examiner* — Hashim S Bhatti
(74) *Attorney, Agent, or Firm* — Xsensus LLP

(57) ABSTRACT

A method, device and system for performing wireless communication in a wireless communication system. The wireless communication system includes a low power node and a macro base station with common baseband and user equipment, and the user equipment communicates with the low power node and the macro base station via a plurality of component carriers. The method includes: receiving, by the user equipment, a downlink signal transmitted by the low power node and the macro base station; and transmitting uplink signals to the low power node and the macro base station, wherein the method further includes: transmitting all first uplink signals of the uplink signals to the low power node as a receiving node. According to the method, device and system, it is possible to improve the efficiency of uplink power control of a terminal and/or reduce the burden for uplink control channel transmission of a macro cell.

18 Claims, 5 Drawing Sheets

Related U.S. Application Data continuation of application No. 15/481,832, filed on Apr. 7, 2017, now Pat. No. 10,314,017, which is a division of application No. 14/786,041, filed as application No. PCT/CN2014/077786 on May 19, 2014, now Pat. No. 10,492,180.

(51) Int. Cl.
  *H04W 52/24* (2009.01)
  *H04L 5/00* (2006.01)
  *H04W 24/08* (2009.01)
  *H04W 28/08* (2009.01)

(52) U.S. Cl.
  CPC .......... *H04L 5/0053* (2013.01); *H04W 24/08* (2013.01); *H04W 52/146* (2013.01); *H04W 52/242* (2013.01); *H04W 28/085* (2013.01)

(56) References Cited

U.S. PATENT DOCUMENTS

| | | | |
|---|---|---|---|
| 10,314,017 B2 | 6/2019 | Qin | |
| 10,492,180 B2 | 11/2019 | Qin | |
| 10,820,306 B2 | 10/2020 | Qin | |
| 2010/0232382 A1 | 9/2010 | Gauvreau et al. | |
| 2010/0323744 A1 | 12/2010 | Kim et al. | |
| 2013/0083754 A1 | 4/2013 | Chen et al. | |
| 2013/0142054 A1 | 6/2013 | Ahmadi | |
| 2013/0156008 A1 | 6/2013 | Dinan | |
| 2013/0301571 A1 | 11/2013 | Sorrentino et al. | |
| 2014/0064251 A1* | 3/2014 | Skov | H04J 11/0053 370/331 |
| 2014/0126556 A1 | 5/2014 | Tiirola et al. | |
| 2014/0128078 A1 | 5/2014 | Zhu et al. | |
| 2014/0177584 A1 | 6/2014 | Ouchi et al. | |
| 2014/0329554 A1 | 11/2014 | Froberg Olsson et al. | |
| 2015/0003418 A1 | 1/2015 | Rosa et al. | |
| 2015/0055582 A1 | 2/2015 | Park et al. | |
| 2015/0229450 A1* | 8/2015 | Noh | H04L 5/0051 370/329 |
| 2015/0245347 A1 | 8/2015 | Yi et al. | |
| 2015/0282238 A1 | 10/2015 | Aminaka et al. | |
| 2015/0304891 A1 | 10/2015 | Dinan | |
| 2015/0358838 A1 | 12/2015 | Wei et al. | |
| 2016/0073345 A1 | 3/2016 | Fan et al. | |

FOREIGN PATENT DOCUMENTS

| | | |
|---|---|---|
| EP | 3 005 804 A1 | 4/2016 |
| JP | 2012015992 A | 1/2012 |
| WO | 2010/104957 A2 | 9/2010 |
| WO | 2012/149661 A1 | 11/2012 |
| WO | 2012/163423 A1 | 12/2012 |
| WO | 2014/190859 A1 | 12/2014 |

OTHER PUBLICATIONS

Office Action issued in Chinese Application 201310202975.8 dated May 31, 2018.
International Search Report dated Sep. 11, 2014, in PCT/CN2014/077786 filed May 19, 2014.
Written Opinion of the International Searching Authority dated Sep. 11, 2014, in PCT/CN2014/077786 filed May 19, 2014.
Nokia Corporation et al., "Discussion on Small Cells Dual Connectivity", 3GPP TSG-RAN WG2 Meeting # 81, R2-130453, XP050668368, Jan. 28-Feb. 1, 2013, 5 pages.
Alcatel-Lucent et al., R1-104077, Remaining Issues on CIF Configuration and Mapping, 3GPP TSG RAN WG1 #61bis (publicly available on 3GPP server on Jun. 22, 2010).

* cited by examiner

METHOD, DEVICE AND SYSTEM FOR PERFORMING WIRELESS COMMUNICATION IN WIRELESS COMMUNICATION SYSTEM

CROSS-REFERENCE TO RELATED APPLICATIONS

The present application is a continuation of U.S. patent application Ser. No. 16/391,320, filed Apr. 23, 2019, which is a continuation of U.S. patent application Ser. No. 15/481,832, filed Apr. 7, 2017 (now U.S. Pat. No. 10,314,017), which is a division of U.S. patent application Ser. No. 14/786,041, filed Oct. 21, 2015 (now U.S. Pat. No. 10,492,180), which is a National Stage of PCT filing PCT/CN2014/077786, filed May 19, 2014, and claims priority to Chinese Patent Application 201310202975.8, filed in the Chinese Patent Office on May 28, 2013, the entire contents of each are incorporated herein by reference.

FIELD OF THE INVENTION

The disclosure relates to the technical field of wireless communication, and particularly to a method for performing wireless communication in a wireless communication system, a wireless communication device and a wireless communication system.

BACKGROUND OF THE INVENTION

This section provides background information related to the disclosure, which is not necessarily prior art.

Carrier aggregation before LTE (Long Term Evolution) Rel-11 is carrier aggregation of a single base station node. An aggregated carrier of a terminal is constituted of one primary component carrier and at least one secondary component carrier. In a FDD (Frequency Division Duplex) mode, association between a downlink primary component carrier and an uplink primary component carrier is determined via a SIB2 (System Information Block 2) message. A PUCCH (Physical Uplink Control Channel) signal is transmitted on the uplink primary component carrier. Normally, only one uplink component carrier performs uplink data transmission. Change of the primary component carrier implies occurrence of a handoff behavior.

In a case where the carrier aggregation is performed between base stations, if a macro base station and a low power node are not in common baseband, then uplink carrier aggregation will occur, and the original primary component carrier setting and association rules are still valid. Since component carriers of the macro base station are mainly used for data transmission related to mobility control, the primary component carriers may include a downlink component carrier of the macro base station. If the uplink primary component carrier is still associated in accordance with the SIB2, then it cannot assist the macro base station in performing PUCCH shunting to alleviate the burden for an uplink control channel of a macro cell in a case where the base station and the low power node perform common baseband transmission. In addition, when the macro base station and the low power node perform CoMP (Coordinated Multi-Point) transmission, and particularly for a case where the macro base station serves as an uplink receiving node, it is unable to perform accurate power control. Further, a solution that takes the macro base station as a receiving node to perform uplink power control is not beneficial to reduce energy consumption of UE (User Equipment).

SUMMARY OF THE INVENTION

This section provides a general summary of the disclosure, rather than a thorough disclosure of the full scope or all features thereof.

The disclosure aims at providing a method for performing wireless communication in a wireless communication system, a wireless communication device and a wireless communication system, which can improve the efficiency of uplink power control of a terminal and/or reduce the burden for uplink control channel transmission of a macro cell.

According to one aspect of the disclosure, a method for performing wireless communication in a wireless communication system is provided. The wireless communication system includes a low power node and a macro base station with common baseband and user equipment, and the user equipment communicates with the low power node and the macro base station via a plurality of component carriers. The method includes: receiving, by the user equipment, a downlink signal transmitted by the low power node and the macro base station; and transmitting uplink signals to the low power node and the macro base station, wherein the method further includes: transmitting all first uplink signals of the uplink signals to the low power node as a receiving node.

According to another aspect of the disclosure, a wireless communication device is provided. The wireless communication device is used to communicate with a low power node and a macro base station with common baseband via a plurality of component carriers, and includes: a receiving unit adapted to receive a downlink signal transmitted by the low power node and the macro base station; a transmitting unit adapted to transmit uplink signals to the low power node and the macro base station; and a control unit adapted to control the transmitting unit to transmit all first uplink signals of the uplink signals to the low power node as a receiving node.

According to another aspect of the disclosure, a wireless communication system is provided. The wireless communication system includes: a macro base station; a low power node in common baseband with the macro base station; and a wireless communication device according to the disclosure, which communicates with the low power node and the macro base station via a plurality of component carriers.

According to another aspect, a communication device operational in a communication system including a first node and a second node, the communication device comprising: circuitry configured to cause communication with the first node and the second node based on carrier aggregation, the communication including: setting a downlink component carrier associated with the first node a downlink primary component carrier, and setting an uplink component carrier associated with the second node as an unlink primary component carrier for transmitting Physical Uplink Control Channel (PUCCH), wherein the communication includes transmitting, using the circuitry, an uplink control signaling via the uplink primary component carrier associated with the second node. The communication can also include, prior to the setting of the uplink component carrier, releasing association of the downlink primary component carrier from the uplink primary component carrier. The first node may be a macro base station and the second node may be a low power node (LPN). Further, the first node may operate at a first frequency, and the second node may operate at a second frequency greater than the first frequency.

The communication can include transmitting, using the circuitry, data packets via the uplink primary component carrier associated with the second node. Optionally, the communication includes transmitting, using the circuitry, Physical Uplink Shared Channel (PUSCH) signals via the uplink primary component carrier associated with the second node. As another option, the communication includes transmitting, using the circuitry, all uplink control signaling via the uplink primary component carrier associated with the second node. And in another option, communication includes transmitting, using the circuitry, uplink control signaling via the uplink primary component carrier associated with the second node to control transmissions between the device and the first node.

The communication can also include receiving, by the circuitry, designation information regarding the uplink primary component carrier via one of Radio Resource Control (RRC) signaling, Media Access Control (MAC) signaling, or physical layer signaling. Further, optionally, the communication includes aggregating multiple component carriers for the second node, and receiving, using the circuitry, information regarding designation of the uplink primary component carrier via one of Radio Resource Control (RRC) signaling, Media Access Control (MAC) signaling, or physical layer signaling.

According to another aspect, a wireless communication method comprising performing communication, using a processor, with a first node and a second node based on carrier aggregation, said communication including setting a downlink component carrier associated with the first node as a downlink primary component carrier, and setting an uplink component carrier associated with the second node as an uplink primary component carrier for transmitting Physical Uplink Control Channel (PUCCH), wherein the communication includes transmitting an uplink control signaling via the uplink primary component carrier associated with the second node. The communication can also include, prior to the setting of the uplink component carrier, decoupling the downlink primary component carrier from the uplink primary component carrier. The first node can be a macro base station, and the second node can be a low power node (LPN).

The communication can include transmitting data packets via the uplink primary component carrier associated with the second node. Optionally, the communication can include transmitting uplink control signaling via the uplink primary component carrier associated with the second node to control transmissions between the processor and the first node. The communication can also include receiving designation information regarding the uplink primary component carrier via one of Radio Resource Control (RRC) signaling, Media Access Control (MAC) signaling, or physical layer signaling. Optionally, the communication includes transmitting Physical Uplink Shared Channel (PUSCH) signals via the uplink primary component carrier associated with the second node.

According to another aspect, a wireless communication device for controlling uplink transmission power for Coordinate Multi-Point (CoMP) transmission of a first node and a second node on a first component carrier at a first frequency, the device comprises: circuitry configured to receive a downlink signal from the second node on a second component carrier at a second frequency different from the first frequency, determine a first downlink path loss associated with receipt of the downlink signal from the second node on the second component carrier at the second frequency, estimate a second downlink path loss associated with the second node performing the CoMP transmission on the first component carrier at the first frequency based on the determined first downlink path loss, and estimate a first uplink path loss of a first uplink signal output from the device to the second node on the first component carrier at the first frequency based on the estimated second downlink path loss, to compensate uplink signal transmission power for the CoMP transmission. The uplink signal may be one of a Physical Uplink Control Channel (PUCCH) signal, Physical Uplink Shared Channel (PUSCH) signal, and a Sounding Reference Signal (SRS).

The circuitry may be configured to compensate the uplink signal transmission power for CoMP transmission to the second node on the first component carrier at the first frequency based on the first uplink path loss. Further, the circuitry can be configured to compensate uplink signal transmission power for CoMP transmission to the first node on the first component carrier at the first frequency based on determination of a third downlink path loss associated with receipt of a downlink signal from the first node on the first component carrier at the first frequency, and determination of a second uplink path loss of a second uplink signal output from the device to the first node on the first component carrier at the first frequency based on the third downlink path loss. Optionally, when the CoMP transmission of the first node and the second node is according to CoMP scenario 4, receiving power associated with the first node is obtained by adding linearly detected reference signal receiving power of cell-specific reference signal of the first and second nodes to receiving power associated with the second node. Alternatively, when the CoMP transmission of the first node and the second node according to CoMP scenario 3, receiving power associated with the first node is obtained by subtracting linearly detected reference signal receiving power of cell-specific reference signal of the first and second nodes from receiving power associated with the second node.

According to yet another aspect a wireless communication method for controlling uplink transmission power for Coordinate Multi-Point (CoMP) transmission of a first node and a second node on a first component carrier at a first frequency, comprises: receiving a downlink signal from the second node on a second component carrier at a second frequency different from the first frequency, determining a first downlink path loss associated with receipt of the downlink signal from the second node on the second component carrier at the second frequency, estimating a second downlink path loss associated with the second node performing the CoMP transmission on the first component carrier at the first frequency based on the determined first downlink path loss, and estimating a first uplink path loss of a first uplink signal output from the device to the second node on the first component carrier at the first frequency based on the estimated second downlink path loss, to compensate uplink signal transmission power for the CoMP transmission.

By transmitting all first uplink signals of the uplink signals to the low power node as a receiving node, the method for performing wireless communication in a wireless communication system, the wireless communication device and the wireless communication system according to the disclosure can improve the efficiency of uplink power control of a terminal and/or reduce the burden for uplink control channel transmission of a macro cell.

Further applicable areas will be apparent from the description provided herein. The description and specific examples in the summary are only for the purpose of illustration, rather than limiting the scope of the disclosure.

BRIEF DESCRIPTION OF THE DRAWINGS

The accompany drawings described here are only for the purpose of illustrating the selected embodiments rather than all possible embodiments, and are not intend to limit the scope of the disclosure. In the accompanying drawings.

Although the disclosure is liable to various modifications and alternations, specific embodiments thereof have been shown as examples in the accompany drawings and are described in detail herein. However, it should be understood that, the description of the specific embodiments herein does not intend to limit the disclosure to the specific forms as disclosed. On the contrary, the disclosure aims at covering all modifications, equivalents and alternations within the spirit and scope of the disclosure. It should be noted that, corresponding reference numbers indicate corresponding components throughout several accompany drawings.

DETAILED DESCRIPTION OF THE INVENTION

Examples of the disclosure are now described more fully with reference to the accompany drawings. The following description is essentially exemplary, but not intended to limit the disclosure, applications and uses.

Exemplary embodiments are provided to make the disclosure more detailed and sufficiently convey the scope thereof to those skilled in the art. Numerous specific details, such as examples of a specific component, a device and a method, are illustrated to provide a thorough understanding of the embodiments of the disclosure. It will be apparent to those skilled in the art that, the exemplary embodiments can be implemented in different ways without using the specific details, and the exemplary embodiments should not be interpreted as limiting the scope of the disclosure. In some exemplary embodiments, well-known processes, well-known structures and well-known technologies are not described in detail.

Figure 1:
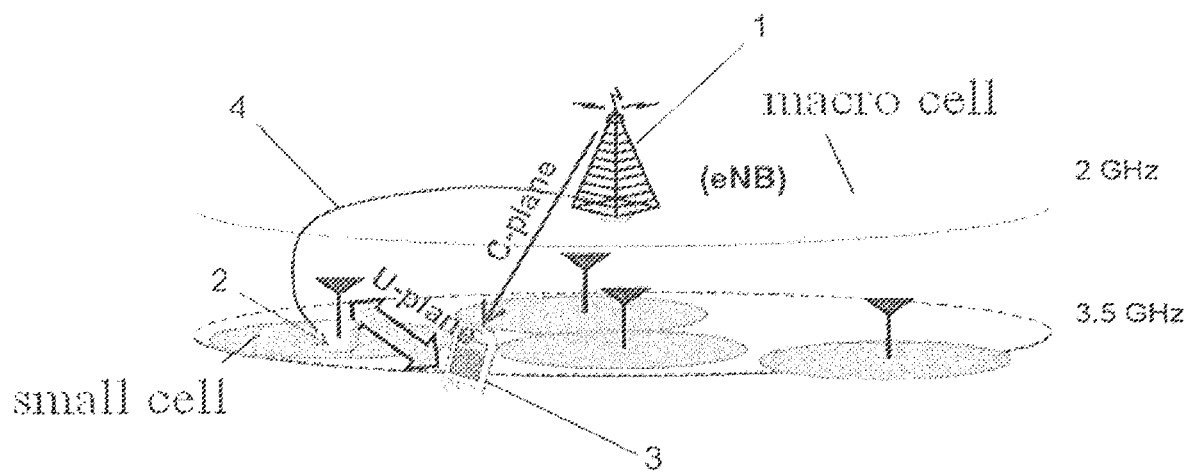
FIG. 1 is a schematic diagram illustrating a scenario of carrier aggregation between base stations.

In the scenario shown in FIG. 1, a macro base station 1 has a wide coverage area which is referred as to a macro cell, and a low power node 2 has a narrow coverage area which is referred as to a small cell. The macro base station 1 has a frequency point of, for example, 2 GHz, and the low power node 2 has a frequency point of, for example, 3.5 GHz. Carrier aggregation may be performed between the macro base station 1 and the low power node 2. The macro base station 1 may be, for example, directly connected to the low power node 2 via an optical fiber 4, so that the macro base station 1 and the low power node 2 are in common baseband. UE (user equipment) 3 may communicate with both the macro base station 1 and the low power node 2 via multiple component carriers.

As an example, the UE 3 has performed carrier aggregation between nodes of the macro base station 1 and the low power node 2, and the aggregated component carriers include a carrier a and a carrier b. Specifically, the low power node 2 and the macro base station 1 perform CoMP (Cooperated Multi-Point) transmission for the UE 3 on the component carrier a, and the low power node separately serves the UE 3 on the carrier b.

As another example, the UE 3 may communicate with the macro base station 1 via a component carrier c, and communicate with the low power node 2 via a component carrier d. A carrier aggregation may be performed for the component carrier c and the component carrier d (carrier aggregation between nodes).

In the prior art, in a case where a carrier aggregation is performed between the macro base station 1 and the low power node 2, original primary component carrier setting and the association rules are still valid. For example, in a FDD mode, association with an uplink primary component carrier may be performed via SIB2 transmitted by a downlink primary component carrier. Alternatively, in the absence of SIB2 content, the UE 3 may acknowledge an uplink primary component carrier via a default frequency point spacing between a downlink primary component carrier and the uplink primary component carrier associated with the downlink primary component carrier. In a TDD (Time Division Duplex) mode, a transmission function of a default downlink primary component carrier and a transmission function of an uplink primary component carrier are performed on a same component carrier.

Since the component carriers of the macro base station 1 are mainly used for data transmission related to mobility control, the primary component carriers may include a downlink component carrier of the macro base station 1. In this way, the primary component carriers will also include an uplink component carrier of the macro base station 1 based on the original primary component carrier setting and the association rules.

In addition, when the UE 3 transmits uplink data on two or more component carriers, in a case of limited power, if uplink transmission power exceeds maximum transmission power, then a case of discarding uplink SRS (Sounding Reference Signal)/PUCCH (Physical Uplink Control Channel)/PUSCH (Physical Uplink Shared Channel) information may occur, thereby resulting in loss of the data transmission. Therefore, uplink data transmission is generally performed on the uplink primary component carrier as much as possible. Therefore, in the case that the macro base station 1 and the low power node 2 perform common baseband transmission as shown in FIG. 1, the low power node cannot assist the macro base station 1 in performing PUCCH shunting to alleviate the burden for an uplink control channel of a macro cell. Further, a solution that takes the macro base station 1 as a receiving node to perform uplink power control is not beneficial to reduce energy consumption of the UE 3.

Figure 2:
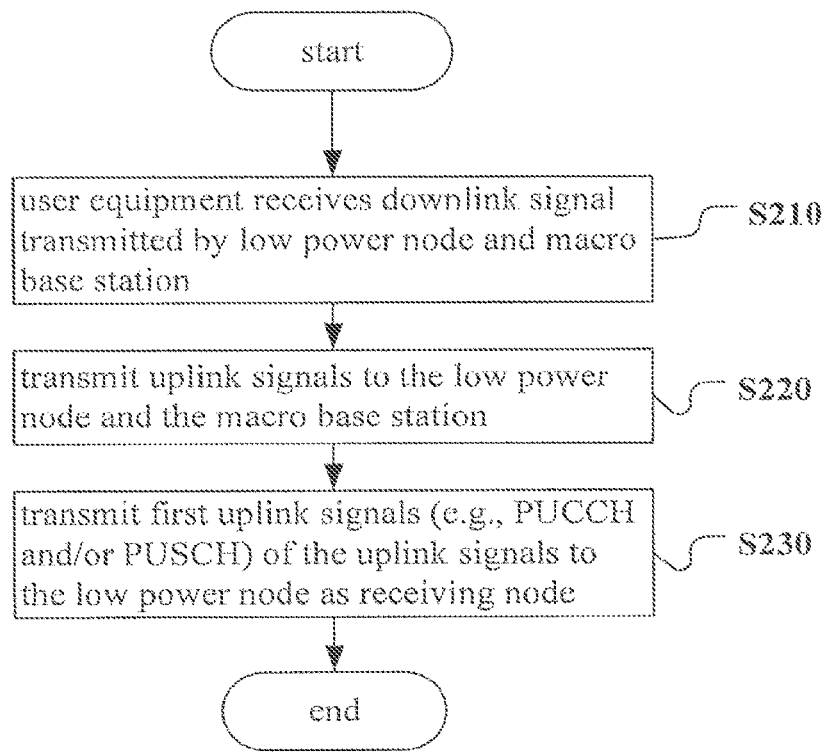
FIG. 2 is a flowchart of a method for performing wireless communication in a wireless communication system according to an embodiment of the disclosure.

In order to alleviate the burden for an uplink control channel of the macro cell and reduce the energy consumption of the UE, an embodiment of the disclosure provides a method for performing wireless communication in a wireless communication system, as shown in FIG. 2. The wireless communication system includes, for example, the low power node 2 and the macro base station 1 with common baseband and the UE 3 as shown in FIG. 1, and the UE 3 communicates with the low power node 2 and the macro base station 1 via multiple component carriers.

As shown in FIG. 2, at step S210, user equipment receives a downlink signal transmitted by the low power node and the macro base station. In FIG. 1, the communication of the UE 3 with the macro base station 1 and the low power node 2 is schematically shown. For example, when the UE 3 is within the coverage area of the macro base station 1 and also within the coverage area of the low power node 2, communication between the macro base station 1 and the UE 3 is performed via a C-plane (control plane), and communication between the low power node 2 and the UE 3 is performed via a U-plane (user plane).

Next, at step S220, uplink signals are transmitted to the low power node and the macro base station. For example, as shown in FIG. 1, the UE 3 may transmit an uplink signal to the low power node 2, and may also transmit an uplink signal to the macro base station 1.

Finally, at step S230, all of first uplink signals of the uplink signals are transmitted to the low power node as a receiving node. The first uplink signals here may include, but are not limited to, a PUCCH signal and/or a PUSCH signal.

Different from a case that the PUCCH signal and the PUSCH signal are only transmitted on a default uplink primary component carrier of the macro base station 1 in the prior art, the method according to an embodiment of the disclosure transmits all of the first uplink signals, including the PUCCH signal and/or the PUSCH signal, to the low power node 2, to achieve shunting of the uplink signals, thereby alleviating the burden for an uplink control channel of the macro cell. In addition, considering that the distance between the UE 3 and the low power node 2 is much shorter than the distance between the UE 3 and the macro base station 1 in a general case, the low power node 2 taken as a receiving node of some uplink signals may be beneficial to reduce energy consumption of the UE 3.

When the carrier aggregation is performed between nodes of the low power node 2 and the macro base station 1, the macro base station 1 sets a downlink component carrier thereof as a downlink primary component carrier. In this case, the method according to an embodiment of the disclosure may release the association between the uplink primary component carrier and the downlink primary component carrier. In other words, the original primary component carrier setting and the association rules are released. In this way, the PUCCH signal and the PUSCH signal will not be only transmitted on the default uplink primary component carrier of the macro base station 1.

In this case, when the wireless communication system is a FDD system, an uplink component carrier of the low power node 2 may be set as the uplink primary component carrier. In this way, the PUCCH signal and the PUSCH signal that are only transmitted on the uplink primary component carrier are transmitted to the low power node 2, thereby achieving shunting of the uplink signals.

In another aspect, when the wireless communication system is a TDD system, the transmission function of the downlink primary component carrier may be performed by a downlink timeslot of a component carrier of the macro base station 1, and the transmission function of the uplink primary component carrier may be performed by an uplink timeslot of a component carrier of the low power node 2. In this way, the PUCCH signal and the PUSCH signal may also be transmitted to the low power node 2, to achieve shunting of the uplink signals.

In addition, if the UE 3 aggregates multiple component carriers on the low power node 2, and, for example, the macro base station 1 does not operate on these component carriers, then the macro base station 1 (or the low power node 2) may inform the UE 3 of the uplink primary component carrier on the low power node 2 via RRC (Radio Resource Control) signaling, MAC (Media Access Control) signaling or DCI (Downlink Control Information) of physical layer. The UE 3 may know the uplink primary component carrier on the low power node 2 by receiving the RRC signaling, the MAC signaling or DCI of the physical layer. Alternatively, the UE 3 may also select by default a component carrier with highest or lowest frequency point from these component carriers as the uplink primary component carrier of the UE 3 on the low power node 2.

Further, when the carrier aggregation between the nodes of the low power node 2 and the macro base station 1 is terminated, the macro base station 1 (or the low power node 2) may inform to recover the association between the uplink primary component carrier and the downlink primary component carrier via the RRC signaling, the MAC signaling or the DCI of the physical layer. The UE 3 may be informed to recover the association between the uplink primary component carrier and the downlink primary component carrier by receiving the RRC signaling, the MAC signaling or the DCI of the physical layer. Alternatively, the UE 3 may also recover by default the association between the uplink primary component carrier and the downlink primary component carrier. An uplink component carrier of the macro base station 1 is set as the uplink primary component carrier after the association between the uplink primary component carrier and the downlink primary component carrier is recovered.

In the following, illustration will be made by taking FIG. 1 as an example. If the UE 3 shown in FIG. 1 aggregates a component carrier of 2 GHz and a component carrier of 3.5 GHz, then since the small cell is mainly responsible for the uplink data transmission, the PUCCH signal and the PUSCH signal are substantially all transmitted on the component carrier of 3.5 GHz. In this case, the PUCCH signaling for uplink transmission of the macro cell is to be integrated into an uplink component carrier (FDD)/an uplink timeslot (TDD) of 3.5 GHz. Meanwhile, for saving transmission power of the UE 3, uplink signaling interaction between the UE 3 and the macro base station 1 may also be transmitted on the uplink component carrier of 3.5 GHz. This operation may be performed by default after entering a carrier aggregation state between base stations, and may also be performed by the downlink primary component carrier via RRC/MAC/physical layer signaling.

If the UE 3 shown in FIG. 1 aggregates two or more component carriers on a frequency band of 3.5 GHz of the small cell, then the downlink primary component carrier specifies the uplink primary component carrier via the RRC/MAC/physical layer signaling, or the network and the UE 3 select by default a component carrier with highest or lowest uplink frequency point from the aggregated carriers of the small cell as the uplink primary component carrier.

If the UE 3 shown in FIG. 1 terminates the carrier aggregation state between the base stations, then the downlink primary component carrier informs the UE 3 to recover the SIB2 association between the uplink primary component carrier and the downlink primary component carrier via the RRC/MAC/physical layer signaling, or the network and the UE 3 automatically recover this association by fault.

Figure 3:
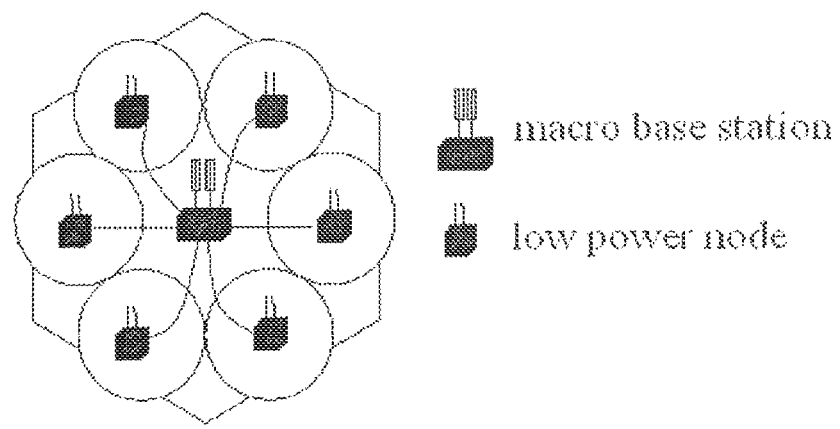
FIG. 3 is a schematic diagram illustrating a common baseband CoMP (Cooperated Multi-Point) transmission in a heterogeneous network.

FIG. 3 shows a topological diagram of common baseband CoMP transmission in a heterogeneous network. In an independent cell ID coordination mode (i.e., a CoMP scenario 3) and a single frequency network coordination mode (i.e. a CoMP scenario 4) as shown in FIG. 3, a function of decoupling a downlink transmitting point and an uplink transmitting point is supported. In this case, if the decoupling of the uplink primary component carrier and the downlink primary component carrier is not performed, then the low power node may still be selected as an uplink target receiving node in accordance with accurate power control, to save transmission power of the uplink PUCCH and uplink PUSCH. In this way, when the SRS is transmitted to the low power node and the macro base station, the accurate power control is also required to ensure correctness in data reception and efficiency of the power consumption.

Original uplink power control performs processing based on a path loss of a downlink transmitting point. If it is in the CoMP scenario 4 (same signals from multiple transmitting points are integrated), then it is undoubted that quality estimation of a downlink channel is too high, thereby resulting in that the path loss compensation power is too low, and further resulting in reduction of reception quality of uplink signal. On the other hand, if the uplink transmission power is increased due to downlink interference of the low power node in the CoMP scenario 3, then interference on the low power node will be further increased.

The inventor of the disclosure suggests that uplink power control adjustment parameters of the PUSCH and the PUCCH are derived based on compensation of inter frequency measurement, thereby optimizing transmission result of the whole uplink data.

In addition, in the LTE/LTE-A TDD system, the SRS may be used for determining timing advance of uplink transmission, and may also be used for estimating quality of a downlink channel according to the characteristic of reciprocity between an uplink channel and the downlink channel. The transmission power in the former case depends on the collection of receiving nodes, but the transmission power in the latter case depends on the collection of transmitting nodes. The inventor has known that fine adjustment may be performed by increasing power control numerical range of the SRS, to minimize the risk of standardized work. The inventor considers that a unity solution is required to solve optimization problems of the uplink power control under these scenarios.

Figure 4:
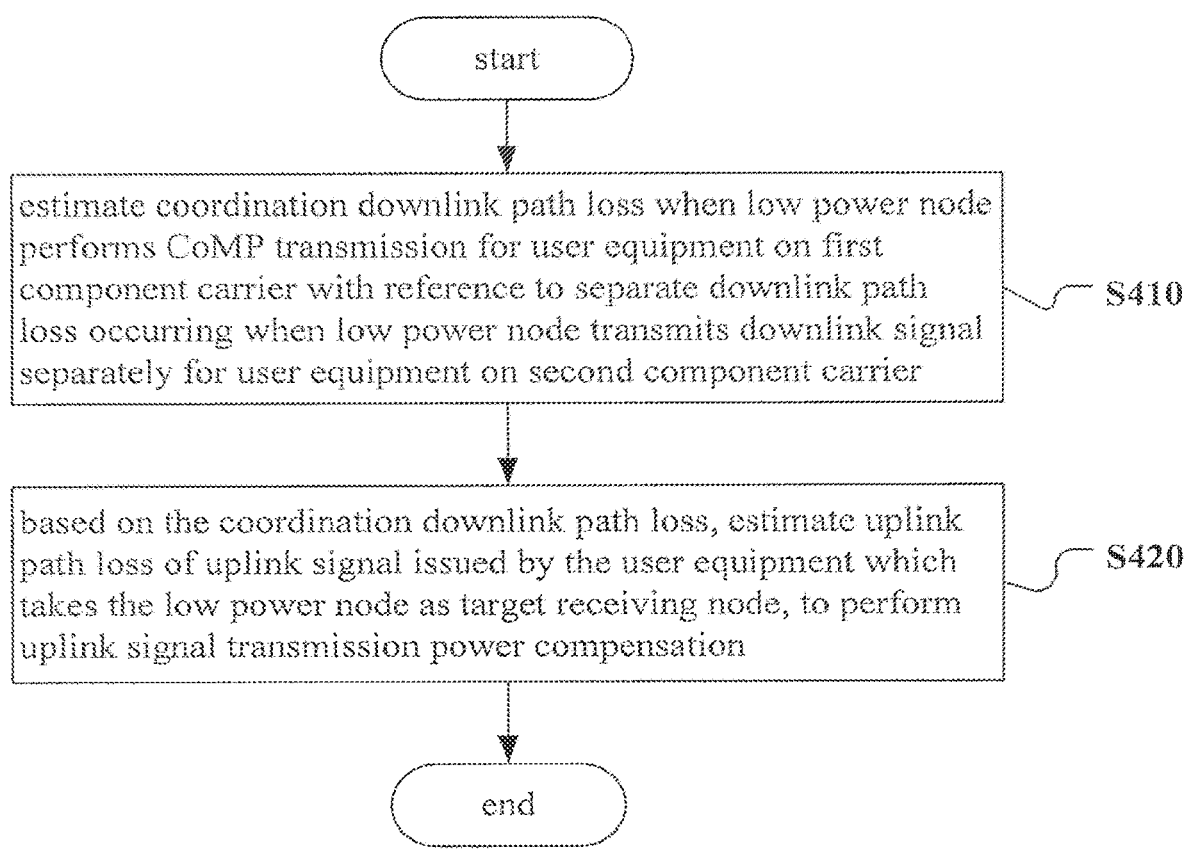
FIG. 4 is a flowchart of a method for performing wireless communication in a wireless communication system according to another embodiment of the disclosure.

FIG. 4 shows a method for path compensation of uplink power control according to an embodiment of the disclosure. The method as shown in FIG. 4 is applicable for a case that the macro base station and the low power node perform CoMP transmission on at least a first component carrier and the low power node further communicates with the user equipment via at least a second component carrier.

As shown in FIG. 4, at step S410, a coordination downlink path loss when the low power node performs the CoMP transmission for the user equipment on the first component carrier is estimated with reference to a separate downlink path loss occurred when the low power node transmits a downlink signal separately for the user equipment on the second component carrier.

The separate downlink path loss may be obtained according to the transmission power when the low power node transmits a CRS (Cell-Specific Reference Signal) separately and linearly detected RSRP (Reference Signal Receiving Power) of the CRS of the low power node.

Next, at step S420, based on the coordination downlink path loss, an uplink path loss of an uplink signal issued by the user equipment which takes the low power node as a target receiving node on the first component carrier is estimated, to perform uplink signal transmission power compensation.

Figure 5:
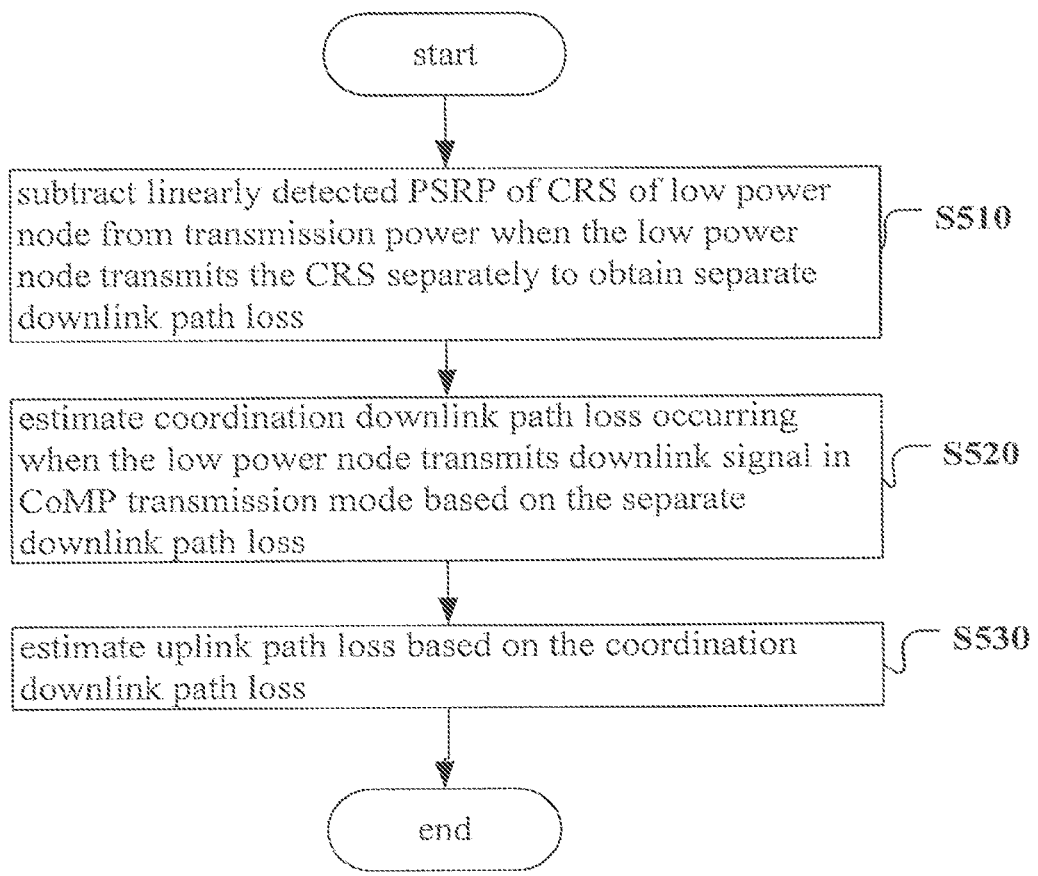
FIG. 5 is a flowchart of a method for performing wireless communication in a wireless communication system according to another embodiment of the disclosure.

FIG. 5 shows an example of a method for estimating an uplink path loss. Specifically, at step S510, linearly detected RSRP of a CRS of the low power node may be subtracted from transmission power when the low power node transmits the CRS separately, to obtain a separate downlink path loss. This may be expressed with the following expression (1).

$$PL_{LPN}^{dB} = \text{TxPower}(LPN\_CRS)^{dB} - 10 \log 10 \text{RSRP}_{LPN}^{Linear}(CRS) \quad (1)$$

wherein $PL_{LPN}^{dB}$ indicates a path loss of the LPN (low power node) in decibels (dB);

$\text{TxPower}(LPN\_CRS)^{dB}$ indicates the transmission power in dB when the LPN transmits the CRS separately; and $10 \log 10 \text{RSRP}_{LPN}^{Linear}$ (CRS) indicates the linearly detected RSRP of the CRS of the LPN.

Next, at step S520, considering a frequency interval between a carrier separately transmitted by the low power node and a CoMP carrier, a height of frequency point, a distance between a terminal and the low power node, historical statistics and other factors, a coordination downlink path loss $f(PL_{LPN}^{dB})$ occurring when the low power node transmits a downlink signal in a CoMP mode may be estimated based on the separate downlink path loss $PL_{LPN}^{dB}$. A deviation value between the separate downlink path loss $PL_{LPN}^{dB}$ and the coordination downlink path loss $f(PL_{LPN}^{dB})$ is related to working frequency points of the two carriers, a frequency offset, a transmission environment of the low power node, a specific position of the terminal within the coverage area of the low power node and the like.

Thereafter, at step S530, an uplink path loss may be estimated based on the coordination downlink path loss $f(PL_{LPN}^{dB})$, for example, according to the characteristic of reciprocity between an uplink channel and a downlink channel. The simplest treatment is that the uplink path loss is considered as being equal to the coordination downlink path loss $f(PL_{LPN}^{dB})$.

In this way, derivation of the uplink power control adjustment parameters of an uplink signal which takes the low power node as a target receiving node is completed based on the compensation of the inter frequency measurement, thereby optimizing the transmission result of the whole uplink data. The uplink signal here may include a PUSCH signal, a PUCCH signal, or a SRS.

Regarding the specific power compensation method, when the uplink signal is a PUSCH signal, for example, the compensation may be performed with the following expression (2):

$$P = \min\{P_{max}, 10 \log M + P_{0\_PUSCH}(j) + \alpha(j) PL + \Delta_{TF} + f(i)\} \quad (2)$$

where P indicates closed-loop power of the PUSCH (i.e., power provided by a terminal to transmit a PUSCH signal);

$P_{max}$ indicates maximum power;

M indicates the number of resource blocks (RB);

$P_{0\_PUSCH}(j)$ indicates a power reference value set by high-level signaling, for reflecting a noise level of an uplink receiving terminal;

$\alpha(j)$ indicates a path loss compensation coefficient;

PL indicates the uplink path loss estimated by the method of the disclosure;

$\Delta_{TF}$ indicates a power offset; and $f(i)$ indicates an adjustment value.

When the uplink signal is a PUCCH signal, for example, the compensation may be performed with the following expression (3):

$$P=\min\{P_{max}, P_{0\_PUSCH}(j)+PL+h(n_{CQI}, n_{HARQ})+\Delta_{F\_PUCCH}(F)+g(i)\} \quad (3)$$

where P indicates closed-loop power of the PUCCH (i.e., power provided by a terminal to transmit a PUCCH signal);

$P_{max}$ indicates maximum power;

$P_{0\_PUSCH}(j)$ indicates a power reference value set by high-level signaling, for reflecting a noise level of an uplink receiving terminal;

PL indicates the uplink path loss estimated by the method of the disclosure;

$h(n_{CQI}, n_{HARQ})$ indicates an offset of the transmission power of the PUCCH;

$\Delta_{F\_PUCCH}(F)$ indicates power offset of the transmission power of the PUCCH of another kind; and $g(i)$ indicates an adjustment value.

When the uplink signal is a SRS, for example, the compensation may be performed with the following expression (4):

$$P=\min\{P_{max}, P_{SRS\_OFFSET}+10 \log M_{SRS}+P_{0\_PUSCH}(j)+\alpha(j)PL+\Delta_{TF}+f(i)\} \quad (4)$$

where P indicates closed-loop power of the SRS (i.e., power provided by a terminal to transmit a SRS);

$P_{max}$ indicates maximum power;

$P_{SRS\_OFFSET}$ indicates a power offset for the SRS;

$M_{SRS}$ indicates the number of resource blocks (RB) required by the SRS;

$P_{0\_PUSCH}(j)$ indicates a power reference value set by high-level signaling, for reflecting a noise level of an uplink receiving terminal;

$\alpha(j)$ indicates a path loss compensation coefficient;

PL indicates the uplink path loss estimated by the method of the disclosure;

$\Delta_F$ indicates a power offset; and $f(i)$ indicates an adjustment value.

The above expressions (2) to (4) are closed-loop power control formulas for the PUSCH, the PUCCH and the SRS, respectively. For open-loop power control, the power compensation may be performed with the following expression (5):

$$PSD_{Tx}=P_0+\alpha \cdot PL \quad (5)$$

where $PSD_{TX}$ indicates open-loop power;

$P_0$ indicates a power reference value set by high-level signaling, for reflecting a noise level of an uplink receiving terminal;

$\alpha$ indicates a path loss compensation coefficient; and

PL indicates the uplink path loss estimated by the method of the disclosure.

The derivation of the uplink power control adjustment parameters of an uplink signal which takes the low power node as the target receiving node has been described above. In a case where the macro base station is taken as the target receiving node, the derivation of the uplink power control adjustment parameters of an uplink signal may also be performed.

According to an embodiment of the disclosure, a coordination downlink path loss when the macro base station performs the CoMP transmission for the user equipment on the first component carrier may be estimated based on the coordination downlink path loss of the low power node.

Specifically, the receiving power of the low power node may be obtained, for example, according to transmission power when the low power node transmits a CRS (Cell-Specific Reference Signal), data or a CSI-RS (Channel State Information-Reference Signal) in the CoMP transmission mode for the user equipment on the first component carrier and the coordination downlink path loss of the low power node.

Further, the receiving power of the macro base station may be obtained according to the linearly detected RSPS of the CRS of the low power node and the macro base station as well as the receiving power of the low power node.

Further, a coordination downlink path loss of the macro base station may be obtained according to the transmission power when the macro base station transmits the CRS in the CoMP transmission mode for the user equipment on the first component carrier and the receiving power of the macro base station.

Next, based on the coordination downlink path loss of the macro base station, an uplink path loss of an uplink signal issued by the user equipment which takes the macro base station as the target receiving node on the first component carrier may be estimated, to perform uplink signal transmission power compensation.

The uplink signal here may also include a PUSCH signal, a PUCCH signal or a SRS. Of course, as mentioned above, if the PUCCH signal and the PUSCH signal that are only transmitted on the uplink primary component carrier are all transmitted to the low power node for achieving shunting of the uplink signals, then an uplink signal which takes the macro base station as the target receiving node may only include a SRS, to predict the quality of a downlink channel of the macro base station according to the reciprocity between an uplink channel and the downlink channel.

Regarding the specific method for estimating an uplink path loss of an uplink signal issued by the user equipment which takes the macro base station as a target receiving node (which is referred to as "an uplink path loss of the macro base station" hereinafter), the expression (1) mentioned above may also be adopted. Specifically, linearly detected RSRP of a CRS of the low power node 10 log 10RS-$RP_{LPN}^{Linear}$(CRS) may be firstly subtracted from transmission power TxPower(LPN_CRS)$^{dB}$ when the low power node transmits the CRS separately, to obtain a separate downlink path loss $PL_{LPN}^{dB}$ of the low power node.

Next, considering a frequency interval between a carrier separately transmitted by the low power node and a CoMP carrier, a height of frequency point, a distance between a terminal and the low power node, historical statistics and other factors, a coordination downlink path loss $f(PL_{LPN}^{dB})$ occurring when the low power node transmits a downlink signal in a CoMP transmission mode may be estimated based on the separate downlink path loss $PL_{LPN}^{dB}$.

Thereafter, an uplink path loss of an uplink signal issued by the user equipment which takes the low power node as the target receiving node (which is referred to as "an uplink path loss of the low power node" hereinafter) may be further estimated based on the coordination downlink path loss $f(PL_{LPN}^{dB})$ of the low power node, for example, according to the characteristic of reciprocity between an uplink channel and a downlink channel.

In a case where the CoMP transmission mode is the single frequency network coordination mode (i.e. the CoMP scenario 4), further estimation of an uplink path loss of the macro base station based on the estimated coordination downlink path loss $f(PL_{LPN}^{dB})$ of the low power node may be performed with the following expression (6):

$$\text{TxPower(Macro\_CRS)}^{dB}-PL_{macro}^{dB}+\text{TxPower(LPN\_CRS)}^{dB}-f(PL_{LPN}^{dB})=10 \log 10 (RSRP_{macro+LPN}^{Linear}(CRS)) \quad (6)$$

where TxPower(Macro_CRS)$^{dB}$ indicates transmission power in dB when the macro base station cooperatively transmits a CRS;

PL$_{macro}^{dB}$ indicates a path loss of the macro base station in dB;

TxPower(LPN_CRS)$^{dB}$ indicates transmission power in dB when the LPN (Low Power Node) cooperatively transmits the CRS; and 10 log 10RSRP$_{macro+LPN}^{Linear}$(CRS) indicates linearly detected RSRP of the CRS of the macro base station and the low power node.

Specifically, the estimated coordination downlink path loss $f(PL_{LPN}^{dB})$ of the low power node may be firstly subtracted from transmission power TxPower(LPN_CRS)$^{dB}$ when the low power node transmits a CRS in the CoMP transmission mode, to obtain receiving power of the low power node.

Further, the receiving power of the low power node may be subtracted from the linearly detected RSRP 10 log 10RSRP$_{macro+LPN}^{Linear}$(CRS) of the CRS of the low power node and the macro base station, to obtain receiving power of the macro base station.

Further, the receiving power of the macro base station may be subtracted from transmission power TxPower(Macro_CRS)$^{dB}$ when the macro base station transmits the CRS in the CoMP transmission mode, to obtain a coordination downlink path loss PL$_{macro}^{dB}$ of the macro base station.

Finally, an uplink path loss of the macro base station may be estimated based on the coordination downlink path loss PL$_{macro}^{dB}$ of the macro base station according to the reciprocity between an uplink channel and a downlink channel. For example, with reference to the expressions (2) to (5) mentioned above, the path loss PL therein is replaced with PL$_{macro}^{dB}$, and then an uplink transmission power value of the PUSCH/PUCCH/SRS of the closed-loop power control and an uplink transmission power value of the open-loop power control may be derived.

In a case where the CoMP transmission is the independent cell ID coordination mode (i.e., the CoMP scenario 3), further estimation of an uplink path loss of the macro base station based on the estimated coordination downlink path loss $f(PL_{LPN}^{dB})$ of the low power node may be performed with the following expression (7):

TxPower(Macro_CRS)$^{dB}$−PL$_{macro}^{dB}$+TxPower(LPN_Data/LPN_CSI)$^{dB}$−$f(PL_{LPN}^{dB})$=10 log 10(RSRP$_{macro+LPN}^{Linear}$(CRS)) (7)

where TxPower(Macro_CRS)$^{dB}$ indicates transmission power in dB when the macro base station cooperatively transmits a CRS;

PL$_{macro}^{dB}$ indicates a path loss of the macro base station in dB;

TxPower(LPN_Data/LPN_CSI)$^{dB}$ indicates transmission power in dB when the LPN (Low Power Node) cooperatively transmits a data signal or a CSI-RS (Channel State Information-Reference Signal); and 10 log 10RSRP$_{macro+LPN}^{Linear}$(CRS) indicates linearly detected RSRP of the CRS of the macro base station and the low power node.

Specifically, the estimated coordination downlink path loss $f(PL_{LPN}^{dB})$ of the low power node may be firstly subtracted from transmission power TxPower(LPN_Data/LPN_CSI)$^{dB}$ when the low power node transmits a data signal or a CSI-RS in the CoMP transmission mode, to obtain receiving power of the low power node.

Further, the receiving power of the low power node may be subtracted from the linearly detected RSRP 10 log 10RSRP$_{macro+LPN}^{Linear}$(CRS) of the CRS of the low power node and the macro base station, to obtain receiving power of the macro base station.

Further, the receiving power of the macro base station may be subtracted from transmission power TxPower(Macro_CRS)$^{dB}$ when the macro base station transmits the CRS in the CoMP transmission mode, to obtain a coordination downlink path loss PL$_{macro}^{dB}$ of the macro base station.

Finally, an uplink path loss of the macro base station may be estimated based on the coordination downlink path loss PL$_{macro}^{dB}$ of the macro base station according to the reciprocity between an uplink channel and a downlink channel. For example, with reference to the expressions (2) to (5) mentioned above, the path loss PL therein is replaced with PL$_{macro}^{dB}$, and then an uplink transmission power value of the PUSCH/PUCCH/SRS of the closed-loop power control and an uplink transmission power value of the open-loop power control may be derived.

It should be understood that, in the above expression (7), TxPower(Macro_CRS)$^{dB}$−PL$_{macro}^{dB}$ indicates the power that the macro base station transmits the CRS to a terminal (receiving power of the macro base station), and TxPower(LPN_Data/LPN_CSI)$_{dB}$−$f(PL_{LPN}^{dB})$ indicates the power that the low power node transmits the data signal or the CSI-RS to the terminal (receiving power of the low power node). The linearly detected RSRP 10 log 10RSRP$_{macro+LPN}^{Linear}$(CRS) of the CRS of the low power node and the macro base station may be obtained by adding the two power values described above.

However, in the calculation of the linearly detected RSRP 10 log 10RSRP$_{macro+LPN}^{Linear}$(CRS) of the CRS of the low power node and the macro base station, the receiving power of the macro base station and the receiving power of the low power node may offset each other, in addition to mutual superimposition. In a case where the receiving power of the macro base station and the receiving power of the low power node offset each other, the uplink path loss of the macro base station may be estimated with the following expression (8):

TxPower(Macro_CRS)$_{dB}$−PL$_{macro}^{dB}$−(TxPower(LPN_Data/LPN_CSI)$^{dB}$−$f(PL_{LPN}^{dB})$)=10 log 10(RSRP$_{macro+LPN}^{Linear}$(CRS)) (8)

In the above expression (8), nothing changes except that the sign between the receiving power of the macro base station and the receiving power of the low power node is changed from a plus sign to a minus sign.

In specific calculation, the estimated coordination downlink path loss $f(PL_{LPN}^{dB})$ of the low power node may also be firstly subtracted from transmission power TxPower(LPN_Data/LPN_CSI)$^{dB}$ when the low power node transmits a data signal or a CSI-RS in the CoMP transmission mode, to obtain receiving power of the low power node.

Further, the linearly detected RSRP 10 log 10RSRP$_{macro+LPN}^{Linear}$(CRS) of the CRS of the low power node and the macro base station may be added the receiving power of the low power node, to obtain receiving power of the macro base station.

Further, the receiving power of the macro base station may be subtracted from transmission power TxPower(Macro_CRS)$^{dB}$ when the macro base station transmits the CRS in the CoMP transmission mode, to obtain a coordination downlink path loss PL$_{macro}^{dB}$ of the macro base station.

Finally, an uplink path loss of the macro base station may be estimated based on the coordination downlink path loss PL$_{macro}^{dB}$ of the macro base station according to the reciprocity between an uplink channel and a downlink channel. For example, with reference to the expressions (2) to (5)

mentioned above, the path loss PL therein is replaced with $PL_{macro}^{dB}$, and then an uplink transmission power value of the PUSCH/PUCCH/SRS of the closed-loop power control and an uplink transmission power value of the open-loop power control may also be derived.

The above expression (8) describes a case that the receiving power of the macro base station and the receiving power of the low power node offset each other and the receiving power of the macro base station is larger than the receiving power of the low power node. For a case that the receiving power of the macro base station and the receiving power of the low power node offset each other and the receiving power of the macro base station is not larger than the receiving power of the low power node, the uplink path loss may be estimated with the following expression (9):

$$\text{TxPower(LPN\_Data/LPN\_CSI)}^{dB} - f(PL_{LPN}^{dB}) - (\text{TxPower(Macro\_CRS)}^{dB} - PL_{macro}^{dB}) = 10 \log 10(\text{RSRP}_{macro+LPN}^{Linear}(\text{CRS})) \quad (9)$$

In specific calculation, the estimated coordination downlink path loss $f(PL_{LPN}^{dB})$ of the low power node may also be firstly subtracted from transmission power TxPower (LPN_Data/LPN_CSI)$^{dB}$ when the low power node transmits a data signal or a CSI-RS in the CoMP transmission mode, to obtain receiving power of the low power node.

Further, the linearly detected RSRP 10 log 10RSRP$_{macro+LPN}^{Linear}$(CRS) of the CRS of the low power node and the macro base station may be subtracted from the receiving power of the low power node, to obtain receiving power of the macro base station.

Further, the receiving power of the macro base station may be subtracted from transmission power TxPower(Macro_CRS)$^{dB}$ when the macro base station transmits the CRS in the CoMP transmission mode, to obtain a coordination downlink path loss $PL_{macro}^{dB}$ of the macro base station.

Finally, an uplink path loss of the macro base station may be estimated based on the coordination downlink path loss $PL_{macro}^{dB}$ of the macro base station according to the reciprocity between an uplink channel and a downlink channel. For example, with reference to the expressions (2) to (5) mentioned above, the path loss PL therein is replaced with $PL_{macro}^{dB}$, and then an uplink transmission power value of the PUSCH/PUCCH/SRS of the closed-loop power control and an uplink transmission power value of the open-loop power control may also be derived.

According to the embodiments of the disclosure, under the heterogeneous network scenario and in a case where common baseband processing is performed between the low power transmission node and the macro base station, when the carrier aggregation is performed between base stations, the uplink PUCCH/PUSCH transmission is transmitted on the aggregated carriers of the low power transmission node as far as possible. If the CoMP transmission is performed between the macro base station and the low power node and uplink data transmission (including the PUCCH, the PUSCH, the SRS and so on) needs to be performed, then the path loss of the low power node on a multi-point transmission frequency band is predicted with reference to the path loss where the low power node separately transmits a carrier, thereby obtaining path loss compensation values of the uplink power control of a macro base station node and the low power node, to perform more accurate uplink power control.

Figure 6:
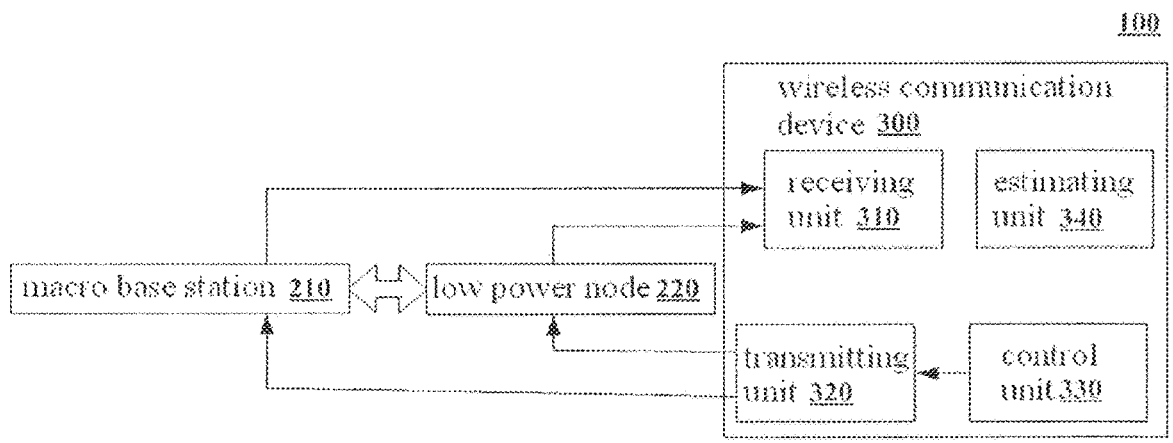
FIG. 6 is a block diagram illustrating a wireless communication system according to an embodiment of the disclosure.

A wireless communication system according to an embodiment of the disclosure is described hereinafter in conjunction with FIG. 6. As shown in FIG. 6, the wireless communication system 100 according to an embodiment of the disclosure includes a macro base station 210, a low power node 220, and a wireless communication device 300. The low power node 220 and the macro base station 210 are in common baseband, and the wireless communication device 300 may communicate with the low power node 220 and the macro base station 210 via multiple component carriers.

The wireless communication device 300 may include a receiving unit 310, a transmitting unit 320, a control unit 330 and the like.

The receiving unit 310 may be used to receive a downlink signal transmitted by the low power node 220 and the macro base station 210.

The transmitting unit 320 may be used to transmit uplink signals to the low power node 220 and the macro base station 210.

The control unit 330 may be used to control the transmitting unit 320 to transmit all of first uplink signals of the uplink signals to the low power node 220 as a receiving node.

The first uplink signals here may include PUCCH signal and/or PUSCH signal.

Carrier aggregation may be performed between the low power node 220 and the macro base station 210, and the macro base station 210 may set a downlink component carrier thereof as a downlink primary component carrier.

In a case where the carrier aggregation is performed between the low power node 220 and the macro base station 210, the control unit 330 may release the association between an uplink primary component carrier and the downlink primary component carrier.

In the FDD mode, the control unit 330 may set an uplink component carrier of the low power node 220 as the uplink primary component carrier.

The wireless communication system 100 may also be a TDD system. In this case, a transmission function of the downlink primary component carrier may be performed by a downlink timeslot of a component carrier of the macro base station 210, and a transmission function of the uplink primary component carrier may be performed by an uplink timeslot of a component carrier of the low power node 220.

The macro base station 210 may inform the wireless communication device 300 of the uplink primary component carrier on the low power node 220 or recovery of the association between the uplink primary component carrier and the downlink primary component carrier via RRC signaling, MAC signaling or DCI of physical layer.

The receiving unit 310 may receive the RRC signaling, the MAC signaling or the DCI of the physical layer, to know the uplink primary component carrier on the low power node 220. Alternatively, in a case where the wireless communication device 300 aggregates multiple component carriers on the low power node 220 and the macro base station 210 does not operate on these component carriers, the control unit 330 may select by default a component carrier with highest or lowest frequency point from these component carriers as the uplink primary component carrier on the low power node 220.

When the carrier aggregation between the low power node 220 and the macro base station 210 is terminated, the receiving unit 310 may also receive the RRC signaling, the MAC signaling or the DCI of the physical layer, to know recovery of the association between the uplink primary component carrier and the downlink primary component carrier. Alternatively, the control unit 330 may also recover by default the association between the uplink primary component carrier and the downlink primary component carrier.

After the association between the uplink primary component carrier and the downlink primary component carrier is recovered, an uplink component carrier of the macro base station 210 may be set as the uplink primary component carrier.

The macro base station 210 and the low power node 220 may perform CoMP transmission on a first component carrier, and the low power node 220 may also communicate with the wireless communication device 300 via a second component carrier. In this case, the wireless communication device 300 may further include an estimating unit 340 to estimate an uplink path loss of an uplink signal issued by the wireless communication device 300 which takes the low power node 220 or the macro base station 210 as a target receiving node, thereby performing uplink signal transmission power compensation.

Specifically, the estimating unit 340 may be used to estimate a coordination downlink path loss when the low power node 220 performs the CoMP transmission for the wireless communication device 300 on the first component carrier, with reference to a separate downlink path loss occurring when the low power node 220 transmits a downlink signal separately for the wireless communication device 300 on the second component carrier. Then, based on the coordination downlink path loss of the low power node 220, the estimating unit 340 may also estimate an uplink path loss of an uplink signal issued by the wireless communication device 300 which takes the low power node 220 as the target receiving node, to perform the uplink signal transmission power compensation.

Further, the estimating unit 340 may be used to estimate a coordination downlink path loss when the macro base station 210 performs the CoMP transmission for the wireless communication device 300 on the first component carrier based on the coordination downlink path loss of the low power node 220. Then, based on the coordination downlink path loss of the macro base station 210, the estimating unit 340 may also estimate an uplink path loss of an uplink signal issued by the wireless communication device 300 which takes the macro base station 210 as a target receiving node, to perform the uplink signal transmission power compensation.

Various specific embodiments of each unit described above of the wireless communication system according to the embodiment of the disclosure have been described in detail hereinbefore, which are not repeated here.

Obviously, each operation process of the method for performing wireless communication in a wireless communication system according to the disclosure may be implemented with a computer executable program stored in various machine readable storage mediums.

Further, the object of the disclosure may be implemented in a way that: a storage medium storing the above executable program code is directly or indirectly provided to a system or an apparatus, and a computer or a CPU (Central Processing Unit) in the system or the apparatus reads and performs the above program code. In this case, provided that the system or the apparatus has a function of performing a program, then the embodiment of the disclosure is not limited to the program, and the program may be in any form, such as an object program, a program executed by an interpreter or a script program provided to an operating system.

These machine readable storage mediums described above include but not limited to various memories and memory cells, semiconductor apparatuses, disk units (such as an optical disk, a magnetic disk and a magneto-optical disk), and other mediums suitable for storing information.

In addition, the technical solution of the disclosure may also be implemented by connecting a computer to a corresponding website on internet, loading and mounting a computer program code according to the disclosure into the computer, and then performing the program.

Figure 7:
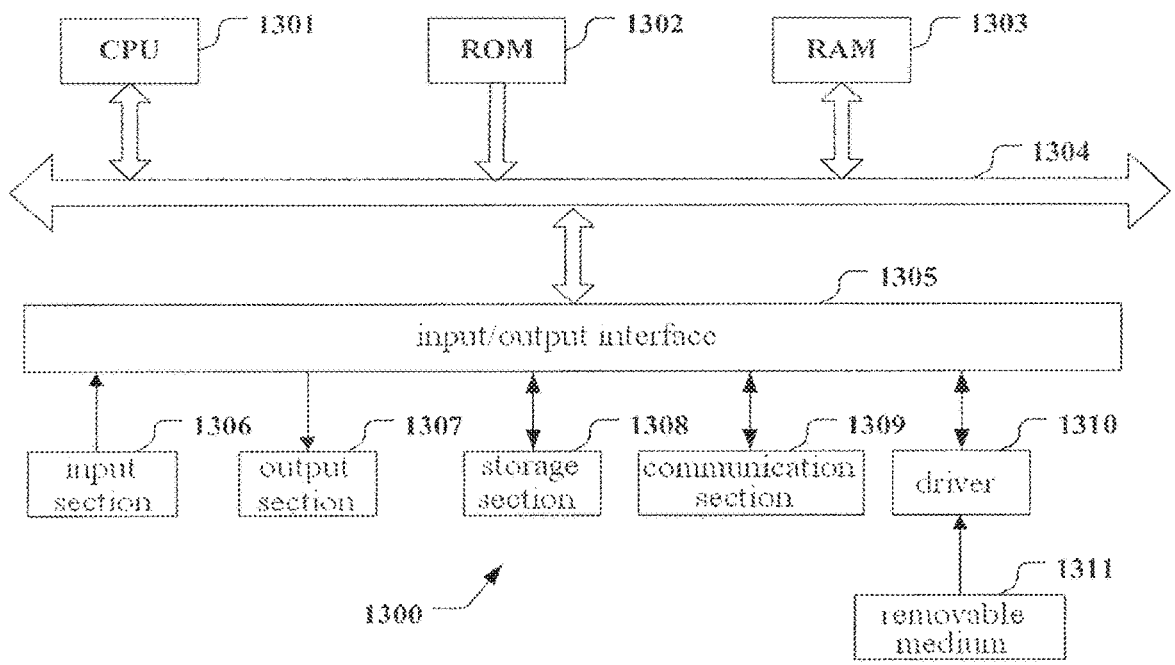
FIG. 7 is a block diagram of an exemplary structure of a general-purpose personal computer in which a method for performing wireless communication in a wireless communication system according to an embodiment of the disclosure can be implemented.

FIG. 7 is a block diagram of an exemplary structure of a general-purpose personal computer in which a method for performing wireless communication in a wireless communication system according to an embodiment of the disclosure can be implemented.

As shown in FIG. 7, a CPU (Central Processing Unit) 1301 performs various processing in accordance with a program stored in a ROM (Read-Only Memory) 1302 or a program loaded from a storage section 1308 into a RAM (Random Access Memory) 1303. In the RAM 1303, data required when the CPU 1301 performs various processing is also stored as necessary. The CPU 1301, the ROM 1302 and the RAM 1303 are connected with each other via a bus 1304. An input/output interface 1305 is also connected to the bus 1304.

The following components are connected to the input/output interface 1305: an input section 1306 (including a keyboard, a mouse and the like), an output section 1307 (including a display (such as a CRT (Cathode-Ray Tube) and a LCD (Liquid Crystal Display)), a speaker and the like), a storage section 1308 (including a hard disk and the like) and a communication section 1309 (including a network interface card such as a LAN (Local Area Network) card, a modem and the like). The communication section 1309 performs communication processing via a network such as internet. A driver 1310 may also be connected to the input/output interface 1305 as necessary. A removable medium 1311, such as a magnetic disk, an optical disk, a magneto-optical disk and a semiconductor memory, may be mounted onto the driver 1310 as necessary, so that a computer program read from the removable medium 1311 may be installed into the storage section 1308 as necessary.

In a case where a series of processing described above is implemented by software, programs constituting the software may be installed from a network such as internet or a storage medium such as the removable medium 1311.

It should be understood by those skilled in the art that, the storage medium is not limited to the removable medium 1311 shown in FIG. 7 which stores a program therein and distributes the program separately from the apparatus to provide the program to a user. Examples of the removable medium 1311 include a magnetic disk (including a floppy disk (registered mark)), an optical disk (including a CD-ROM (Compact Disc Read Only Memory) and a DVD (Digital Versatile Disk)), a magneto-optical disk (including a MD (Mini Disk) (registered mark)) and a semiconductor memory. Alternatively, the storage medium may be a hard disk included in the ROM 1302 or the storage section 1308 and the like, which stores a program therein and is distributed to the user together with the apparatus in which the storage medium is included.

(1) A method for performing wireless communication in a wireless communication system, the wireless communication system comprising a low power node and a macro base station with common baseband and a user equipment, the user equipment communicating with the low power node and the macro base station via a plurality of component carriers, and the method comprising: receiving, by the user equipment, a downlink signal transmitted by the low power node and the macro base station; and transmitting uplink signals to the low power node and the macro base station, wherein the method further comprises: transmitting all of first uplink signals of the uplink signals to the low power node as a receiving node.

(2) The method according to (1), wherein the first uplink signals include a Physical Uplink Control Channel (PUCCH) signal and/or a Physical Uplink Shared Channel (PUSCH) signal.

(3) The method according to (1) or (2), wherein carrier aggregation is performed between the low power node and the macro base station, and the macro base station sets a downlink component carrier of the macro base station as a downlink primary component carrier.

(4) The method according to any one of (1) to (3), further comprising: releasing association between an uplink primary component carrier and the downlink primary component carrier.

(5) The method according to any one of (1) to (4), wherein the wireless communication system is a Frequency Division Duplex (FDD) system, and the method further comprises: setting an uplink component carrier of the low power node as the uplink primary component carrier.

(6) The method according to any one of (1) to (4), wherein the wireless communication system is a Time Division Duplex (TDD) system, a transmission function of the downlink primary component carrier is performed by a downlink timeslot of a component carrier of the macro base station, and a transmission function of the uplink primary component carrier is performed by an uplink timeslot of a component carrier of the low power node.

(7) The method according to any one of (4) to (6), further comprising: knowing the uplink primary component carrier on the low power node by receiving Radio Resource Control (RRC) signaling, Media Access Control (MAC) signaling or Downlink Control Information (DCI) of physical layer.

(8) The method according to any one of (4) to (7), wherein in a case where the user equipment aggregates the plurality of component carriers on the low power node and the macro base station does not operate on the plurality of component carriers, the method further comprises: knowing the uplink primary component carrier on the low power node by receiving RRC signaling, MAC signaling or DCI of physical layer; or selecting by default a component carrier with highest or lowest frequency point from the plurality of component carriers as the uplink primary component carrier on the low power node.

(9) The method according to any one of (4) to (7), wherein when the carrier aggregation between the low power node and the macro base station is terminated, the method further comprises: knowing recovery of the association between the uplink primary component carrier and the downlink primary component carrier by receiving RRC signaling, MAC signaling or DCI of physical layer; or recovering by default the association between the uplink primary component carrier and the downlink primary component carrier, wherein an uplink component carrier of the macro base station is set as the uplink primary component carrier after the association between the uplink primary component carrier and the downlink primary component carrier is recovered.

(10) The method according to any one of (1) to (9), wherein the macro base station and the low power node perform Coordinated Multi-Point (CoMP) transmission on at least a first component carrier, and the low power node further communicates with the user equipment via at least a second component carrier.

(11) The method according to any one of (1) to (10), further comprising: estimating a first coordination downlink path loss when the low power node performs the CoMP transmission for the user equipment on the first component carrier, with reference to a separate downlink path loss occurring when the low power node transmits a downlink signal separately for the user equipment on the second component carrier; and estimating, based on the first coordination downlink path loss, a first uplink path loss of an uplink signal issued by the user equipment which takes the low power node as a target receiving node on the first component carrier, to perform uplink signal transmission power compensation.

(12) The method according to anyone of (1) to (11), wherein the separate downlink path loss is obtained in accordance with transmission power when the low power node transmits a Cell-Specific Reference Signal (CRS) separately and a linearly detected Reference Signal Receiving Power (RSRP) of the CRS of the low power node.

(13) The method according to (12), further comprising: estimating a second coordination downlink path loss when the macro base station performs the CoMP transmission for the user equipment on the first component carrier, based on the first coordination downlink path loss; and estimating, based on the second coordination downlink path loss, a second uplink path loss of an uplink signal issued by the user equipment which takes the macro base station as a target receiving node on the first component carrier, to perform the uplink signal transmission power compensation.

(14) The method according to (13), wherein first receiving power is obtained in accordance with transmission power when the low power node transmits a CRS, data or a Channel State Information-Reference Signal (CSI-RS) in the CoMP transmission mode for the user equipment on the first component carrier and the first coordination downlink path loss, second receiving power is obtained in accordance with linearly detected RSRP of the CRS of the low power node and the macro base station and the first receiving power, and the second coordination downlink path loss is obtained in accordance with transmission power when the macro base station transmits the CRS in the CoMP transmission mode for the user equipment on the first component carrier and the second receiving power.

(15) The method according to (13) or (14), wherein the uplink signal issued by the user equipment which takes the macro base station as the target receiving node includes a Sounding Reference Signal (SRS).

(16) A wireless communication device, adapted to communicate with a low power node and a macro base station with common baseband via a plurality of component carriers, the wireless communication device comprising: a receiving unit adapted to receive a downlink signal transmitted by the low power node and the macro base station; a transmitting unit adapted to transmit uplink signals to the low power node and the macro base station; and a control unit adapted to control the transmitting unit to transmit all of first uplink signals of the uplink signals to the low power node as a receiving node.

(17) The wireless communication device according to (16), wherein the first uplink signals include a PUCCH signal and/or a PUSCH signal.

(18) The wireless communication device according to (16) or (17), wherein in a case where carrier aggregation is performed between the low power node and the macro base station, the control unit releases association between an uplink primary component carrier and a downlink primary component carrier.

(19) The wireless communication device according to any one of (16) to (18), wherein the control unit sets an uplink component carrier of the low power node as the uplink primary component carrier.

(20) The wireless communication device according to any one of (16) to (19), wherein the receiving unit receives RRC signaling, MAC signaling or DCI of physical layer, to know the uplink primary component carrier on the low power node or recovery of the association between the uplink primary component carrier and the downlink primary component carrier.

(21) The wireless communication device according to any one of (16) to (20), wherein in a case where the wireless communication device aggregates the plurality of component carriers on the low power node and the macro base station does not operate on the plurality of component carriers, the control unit selects by default a component carrier with highest or lowest frequency point from the plurality of component carriers as the uplink primary component carrier on the low power node.

(22) The wireless communication device according to any one of (16) to (20), wherein when the carrier aggregation between the low power node and the macro base station is terminated, the control unit recovers by default the association between the uplink primary component carrier and the downlink primary component carrier.

(23) The wireless communication device according to (16), wherein in a case where the macro base station and the low power node perform CoMP transmission on a first component carrier and the low power node further communicates with the wireless communication device via a second component carrier, the wireless communication device further comprises an estimating unit configured to: estimate a first coordination downlink path loss when the low power node performs the CoMP transmission for the wireless communication device on the first component carrier, with reference to a separate downlink path loss occurring when the low power node transmits a downlink signal separately for the wireless communication device on the second component carrier; and estimate, based on the first coordination downlink path loss, a first uplink path loss of an uplink signal issued by the wireless communication device which takes the low power node as a target receiving node, to perform uplink signal transmission power compensation.

(24) The wireless communication device according to (23), wherein the estimating unit is further configured to: estimate a second coordination downlink path loss when the macro base station performs the CoMP transmission for the wireless communication device on the first component carrier, based on the first coordination downlink path loss; and estimate, based on the second coordination downlink path loss, a second uplink path loss of an uplink signal issued by the wireless communication device which takes the macro base station as a target receiving node, to perform the uplink signal transmission power compensation.

(25) A wireless communication system comprising: a macro base station; a low power node in common baseband with the macro base station; and a wireless communication device according to any one of (16) to (24) which communicates with the low power node and the macro base station via a plurality of component carriers.

(26) The wireless communication system according to (25), wherein the macro base station informs the wireless communication device of an uplink primary component carrier on the low power node or recovery of association between an uplink primary component carrier and a downlink primary component carrier via RRC signaling, MAC signaling or DCI of physical layer.

(1) A communication device operational in a communication system including a first node and a second node in common baseband with each other, the communication device comprising: circuitry configured to cause carrier aggregation between the first node and the second node with the first node and the second node in common baseband with each other, the carrier aggregation including: setting a downlink component carrier associated with the first node as a downlink primary component carrier, and setting an uplink component carrier associated with the second node as an uplink primary component carrier.

(2) The device according to (1), wherein the carrier aggregation includes transmitting, using the circuitry, at least one of uplink control signaling and data packets via the uplink primary component carrier associated with the second node.

(3) The device according to (1) or (2), wherein the carrier aggregation includes, prior to said setting the uplink component carrier, releasing association of the downlink primary component carrier from the uplink primary component carrier.

(4) The device according to any one of (1) to (3), wherein the first node is a macro base station and the second node is a low power node (LPN).

(5) The device according to any one of (1) to (4), wherein the first node operates at a first frequency and the second node operates at a second frequency greater than the first frequency.

(6) The device according to any one of (1) and (3) to (5), wherein the carrier aggregation includes transmitting, using the circuitry, uplink control signaling via the uplink primary component carrier associated with the second node to control transmissions between the device and the first node.

(7) The device according to any one of (1) to (6), wherein the carrier aggregation includes receiving, by the circuitry, designation information regarding the uplink primary component carrier via one of Radio Resource Control (RRC) signaling, Media Access Control (MAC) signaling, or physical layer signaling.

(8) The device according to any one of (1) to (6), wherein the carrier aggregation includes aggregating multiple component carriers for the second node, and receiving, by the circuitry, information regarding designation of the uplink primary component carrier via one of Radio Resource Control (RRC) signaling, Media Access Control (MAC) signaling, or physical layer signaling.

(9) The device according to any one of (1) to (8), wherein the carrier aggregation includes transmitting, using the circuitry, at least one of Physical Uplink Control Channel (PUCCH) signals and Physical Uplink Shared Channel (PUSCH) signals via the uplink primary component carrier associated with the second node.

(10) The device according to any one of (1) to (8), wherein the carrier aggregation includes transmitting, using the circuitry, all uplink control signaling via the uplink primary component carrier associated with the second node.

(11) A wireless communication method comprising: performing carrier aggregation, using a processor, between a first node and a second node with the first node and the second node in common baseband with each other, said carrier aggregation including: setting a downlink component carrier associated with the first node as a downlink primary component carrier, and setting an uplink component carrier associated with the second node as an uplink primary component carrier.

(12) The wireless communication method according to (11), wherein the carrier aggregation includes transmitting uplink control signaling via the uplink primary component carrier associated with the second node to control transmissions between the processor and the first node.

(13) The wireless communication method according to (11) or (12), wherein the carrier aggregation includes receiving designation information regarding the uplink primary component carrier via one of Radio Resource Control (RRC) signaling, Media Access Control (MAC) signaling, or physical layer signaling.

(14) A wireless communication device for controlling uplink transmission power for Coordinate Multi-Point (CoMP) transmission of a first node and a second node on a first component carrier at a first frequency, the device comprising: circuitry configured to receive a downlink signal from the second node on a second component carrier at a second frequency different from the first frequency, determine a first downlink path loss associated with receipt of the downlink signal from the second node on the second component carrier at the second frequency, estimate a second downlink path loss associated with the second node performing the CoMP transmission on the first component carrier at the first frequency based on the determined first downlink path loss, and estimate a first uplink path loss of a first uplink signal output from the device to the second node on the first component carrier at the first frequency based on the estimated second downlink path loss, to compensate uplink signal transmission power for the CoMP transmission.

(15) The device according to (14), wherein the uplink signal is one of a Physical Uplink Control Channel (PUCCH) signal, Physical Uplink Shared Channel (PUSCH) signal, and a Sounding Reference Signal (SRS).

(16) The device according to (14) or (15), wherein the circuitry is configured to compensate the uplink signal transmission power for CoMP transmission to the second node on the first component carrier at the first frequency based on the first uplink path loss.

(17) The device according to any one of (14) to (16), wherein the circuitry is configured to compensate uplink signal transmission power for CoMP transmission to the first node on the first component carrier at the first frequency based on determination of a third downlink path loss associated with receipt of a downlink signal from the first node on the first component carrier at the first frequency, and determination of a second uplink path loss of a second uplink signal output from the device to the first node on the first component carrier at the first frequency based on the third downlink path loss.

(18) The device according to any one of (14) to (17), when the CoMP transmission of the first node and the second node is according to CoMP scenario 4, receiving power associated with the first node is obtained by adding linearly detected reference signal receiving power of cell-specific reference signal of the first and second nodes to receiving power associated with the second node.

(19) The device according to any one of (14) to (17), wherein, when the CoMP transmission of the first node and the second node according to CoMP scenario 3, receiving power associated with the first node is obtained by subtracting linearly detected reference signal receiving power of cell-specific reference signal of the first and second nodes from receiving power associated with the second node.

(20) A wireless communication method for controlling uplink transmission power for Coordinate Multi-Point (CoMP) transmission of a first node and a second node on a first component carrier at a first frequency, the method comprising: receiving a downlink signal from the second node on a second component carrier at a second frequency different from the first frequency, determining a first downlink path loss associated with receipt of the downlink signal from the second node on the second component carrier at the second frequency, estimating a second downlink path loss associated with the second node performing the CoMP transmission on the first component carrier at the first frequency based on the determined first downlink path loss, and estimating a first uplink path loss of a first uplink signal output from the device to the second node on the first component carrier at the first frequency based on the estimated second downlink path loss, to compensate uplink signal transmission power for the CoMP transmission.

Obviously, in the system and the method of the disclosure, individual components or individual steps may be decomposed and/or recombined. These decompositions and/or recombinations should be considered as equivalent solutions of the disclosure. Further, the steps for performing the series of processing described above may be performed naturally in time sequence illustrated herein, but are not necessary to be performed in the time sequence. Some steps may be performed in parallel or independently of each other.

Although the embodiments of the disclosure have been described above in detail in conjunction with the accompanying drawings, it should be understood that, embodiments described above are only used for illustrating the disclosure, rather than limiting the disclosure. Various modifications and variants may be made to the above embodiments by those skilled in the art without deviation from the spirit and scope of the disclosure. Therefore, the scope of the disclosure is only defined by the appended claims and the equivalents thereof.

The invention claimed is:

1. A communication device operational as a first node in a communication system including a user terminal and a second node, the communication device comprising:
   circuitry configured to cause communication with the user terminal with multiple component carriers, the communication including:
   obtaining a downlink component carrier as a downlink primary component carrier for communication with the user terminal, changing the downlink primary component carrier only in a condition of a
   handover, obtaining an uplink component carrier for receiving a Physical Uplink Control Channel (PUCCH) from the user terminal, and
   transmitting, via Radio Resource Control (RRC) signaling, designation information regarding an uplink primary component carrier to override an uplink primary component carrier set as a default uplink primary component carrier by the user terminal;
   wherein the circuitry is further s configured to receive PUCCH signals on both of an uplink component carrier associated with the second node and an uplink component carrier associated with the first node.

2. The device according to claim 1, wherein the circuitry is further configured to transmit PUCCH signals on the uplink component carrier.

3. The device according to claim 1, wherein the first node is a macro base station and the second node is a low power node.

4. The device according to claim 3, wherein the circuitry is further configured to obtain the second node as the default uplink primary component carrier.

5. The device according to claim 3, wherein the circuitry is further configured to obtain the first node as the default uplink primary component carrier.

6. The device according to claim 1, wherein the uplink primary component carrier is associated with a different node than the downlink primary component carrier.

7. The device according to claim 1, wherein the first node operates at a first frequency and the second node operates at a second frequency higher than the first frequency.

8. The device according to claim 1, wherein the circuitry is further configured to receive uplink control signaling via the uplink component carrier to control transmissions between the user terminal and the first node.

9. The device according to claim 1, wherein the first node and the second node are in common baseband with each other.

10. A communication device operational as a user terminal in a communication system including a first node and a second node, the communication device comprising:
    circuitry configured to cause communication with the first and second nodes with multiple component carriers, the communication including:
    setting a downlink component carrier associated with a first node as a downlink primary component carrier, changing the downlink primary component carrier only in a condition of a
    handover, setting an uplink component carrier for receiving a Physical Uplink Control Channel (PUCCH) from the user terminal, and
    receiving, via Radio Resource Control (RRC) signaling, designation information regarding an uplink primary component carrier to override an uplink primary component carrier set as a default uplink primary component carrier by the user terminal;
    wherein the circuitry is further configured to transmit PUCCH signals on both of an uplink component carrier associated with the second node and an uplink component carrier associated with the first node.

11. The device according to claim 10, wherein the circuitry is further configured to transmit PUCCH signals on the uplink component carrier.

12. The device according to claim 10, wherein the first node is a macro base station and the second node is a low power node.

13. The device according to claim 12, wherein the circuitry is further configured to set the second node as the default uplink primary component carrier.

14. The device according to claim 12, wherein the circuitry is further configured to set the first node as the default uplink primary component carrier.

15. The device according to claim 10, wherein the uplink primary component carrier is associated with a different node than the downlink primary component carrier.

16. The device according to claim 10, wherein the first node operates at a first frequency and the second node operates at a second frequency higher than the first frequency.

17. The device according to claim 10, wherein the circuitry is further configured to estimate an uplink path loss and perform uplink signal transmission power compensation.

18. The device according to claim 10, wherein the first node and the second node are in common baseband with each other.

* * * * *